United States Patent
Shin et al.

(10) Patent No.: US 11,650,918 B2
(45) Date of Patent: May 16, 2023

(54) METHOD AND APPARATUS FOR COMPRESSING ADDRESSES

(71) Applicant: RESEARCH & BUSINESS FOUNDATION SUNGKYUNKWAN UNIVERSITY, Suwon-si (KR)

(72) Inventors: Dong Kun Shin, Seoul (KR); Gyeong Hwan Hong, Yongin-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 0 days.

(21) Appl. No.: 17/528,664

(22) Filed: Nov. 17, 2021

(65) Prior Publication Data

US 2022/0156186 A1 May 19, 2022

(30) Foreign Application Priority Data

Nov. 17, 2020 (KR) .................. 10-2020-0154112

(51) Int. Cl.
*G06F 12/00* (2006.01)
*G06F 12/0802* (2016.01)

(52) U.S. Cl.
CPC .... *G06F 12/0802* (2013.01); *G06F 2212/608* (2013.01)

(58) Field of Classification Search
CPC ............. G06F 12/0802; G06F 2212/608
See application file for complete search history.

(56) References Cited

U.S. PATENT DOCUMENTS

| 2012/0084261 A1 | 4/2012 | Parab |
| 2017/0255388 A1* | 9/2017 | Sharma .................. G06F 12/10 |
| 2018/0052631 A1 | 2/2018 | Kalyanasundharam et al. |

FOREIGN PATENT DOCUMENTS

KR 10-2019-0032527 A 3/2019

OTHER PUBLICATIONS

Park, Eunsoo "Heap Memory Allocation Technique of Lightweight JavaScript Engine for the IoT Devices" Master's Thesis, *Department of IT Convergence*, The Graduate School Sungkyunkwan University, Oct. 2016, (42 pages in English).
Korean Office Action dated Jul. 18, 2022, in counterpart Korean Patent Application No. 10-2020-0154112 (5 pages in Korean).

\* cited by examiner

*Primary Examiner* — Gurtej Bansal
(74) *Attorney, Agent, or Firm* — NSIP Law

(57) ABSTRACT

A method of compressing an address includes receiving an input of a full address including a first part and a second part; checking a segment base address based on the first part in a previously stored reverse map cache (RMC); obtaining a block offset based on the segment base address and the second part; and outputting a compressed address by compressing the first part and the second part, respectively, based on the segment base address and the block offset.

11 Claims, 12 Drawing Sheets

[FIG. 2]
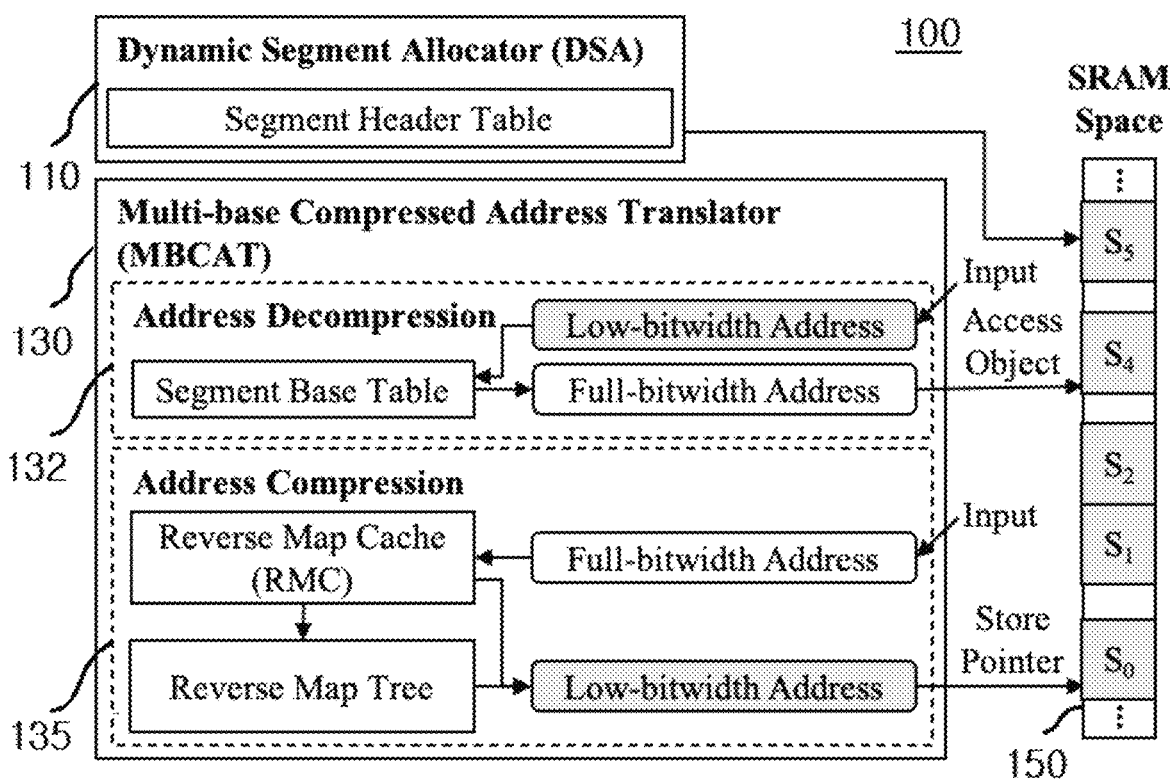

[FIG. 3]
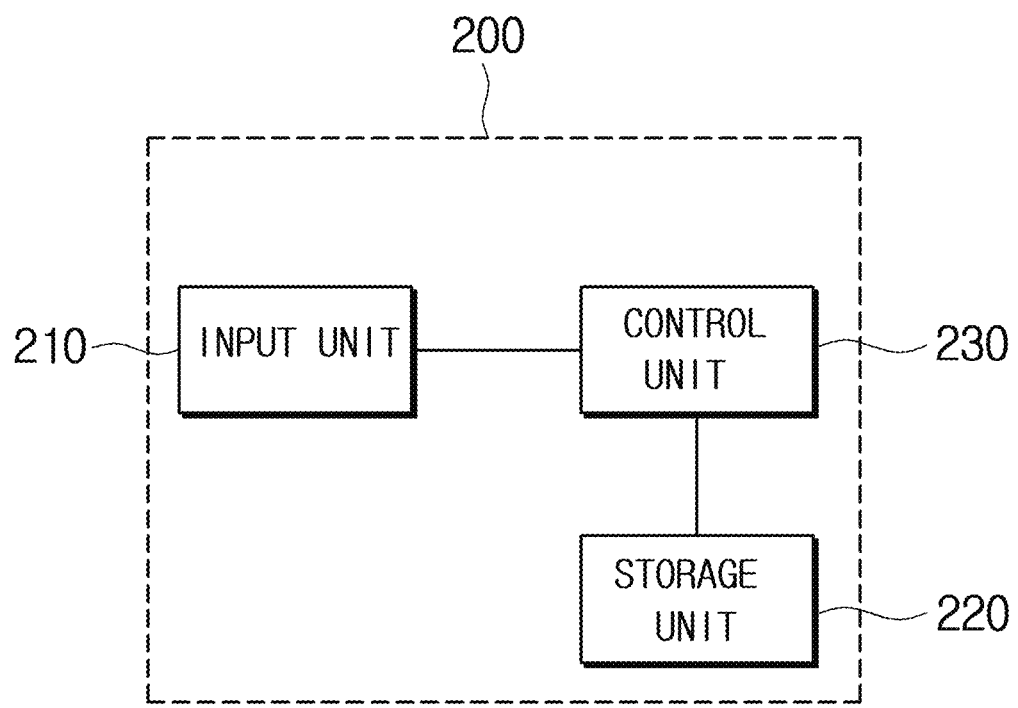

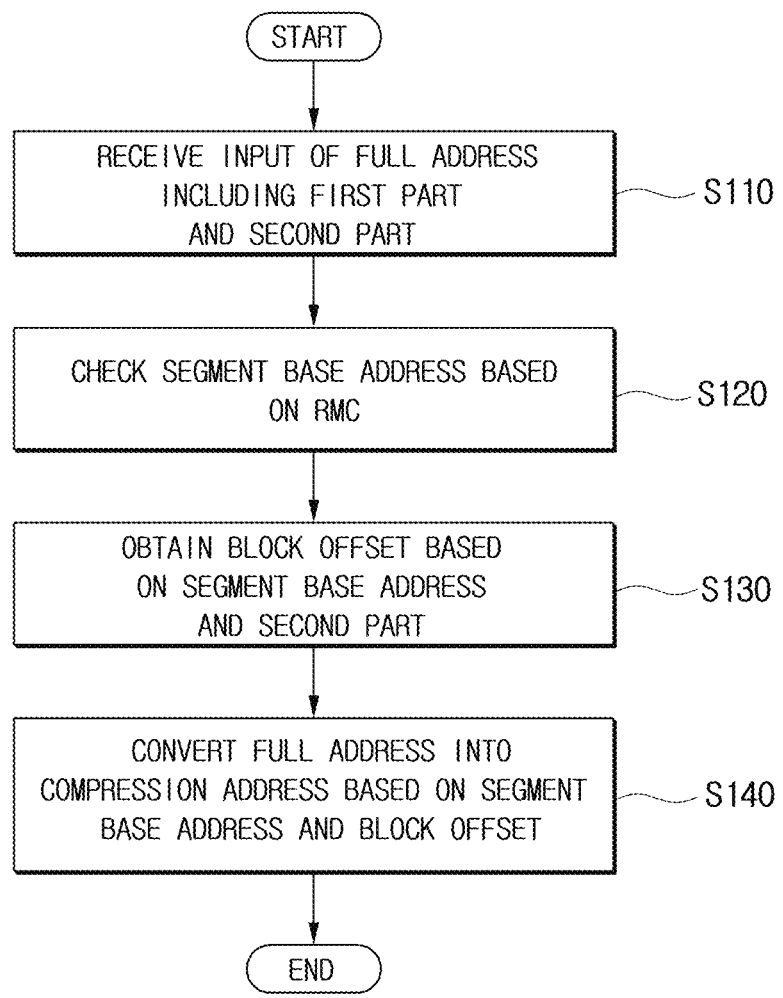
[FIG. 4]

[FIG. 5]
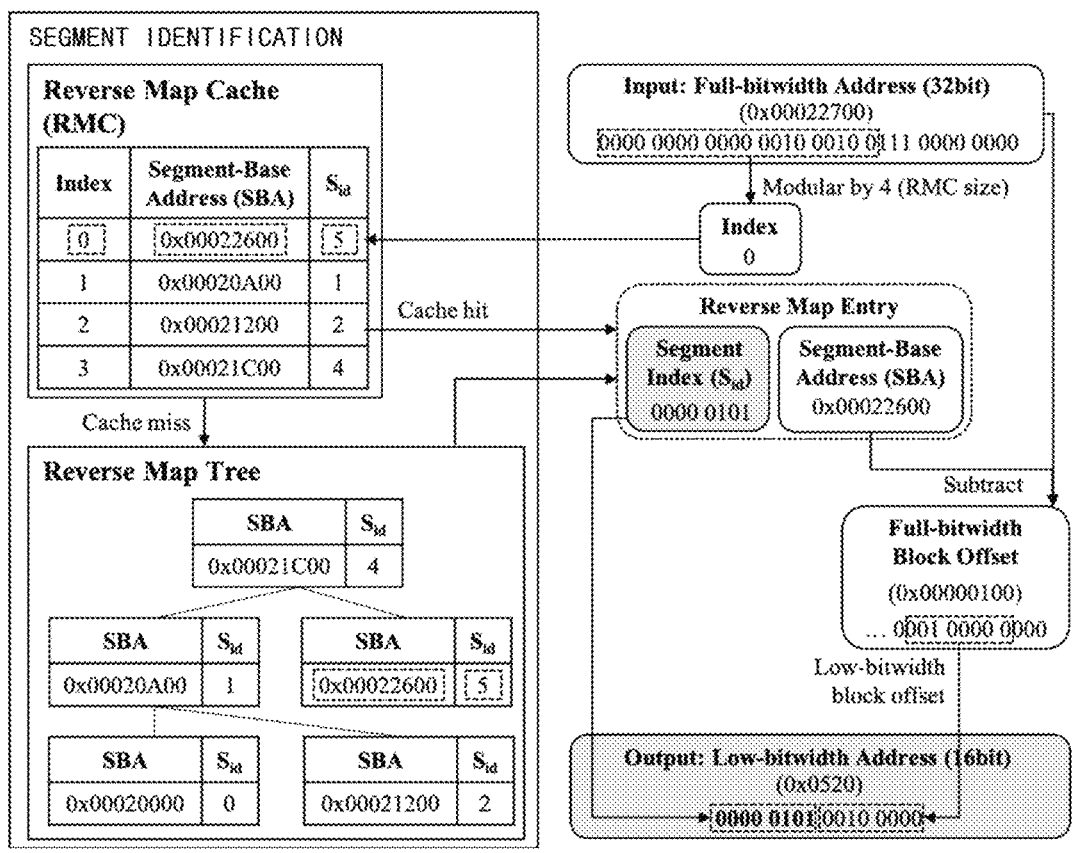

[FIG. 6]
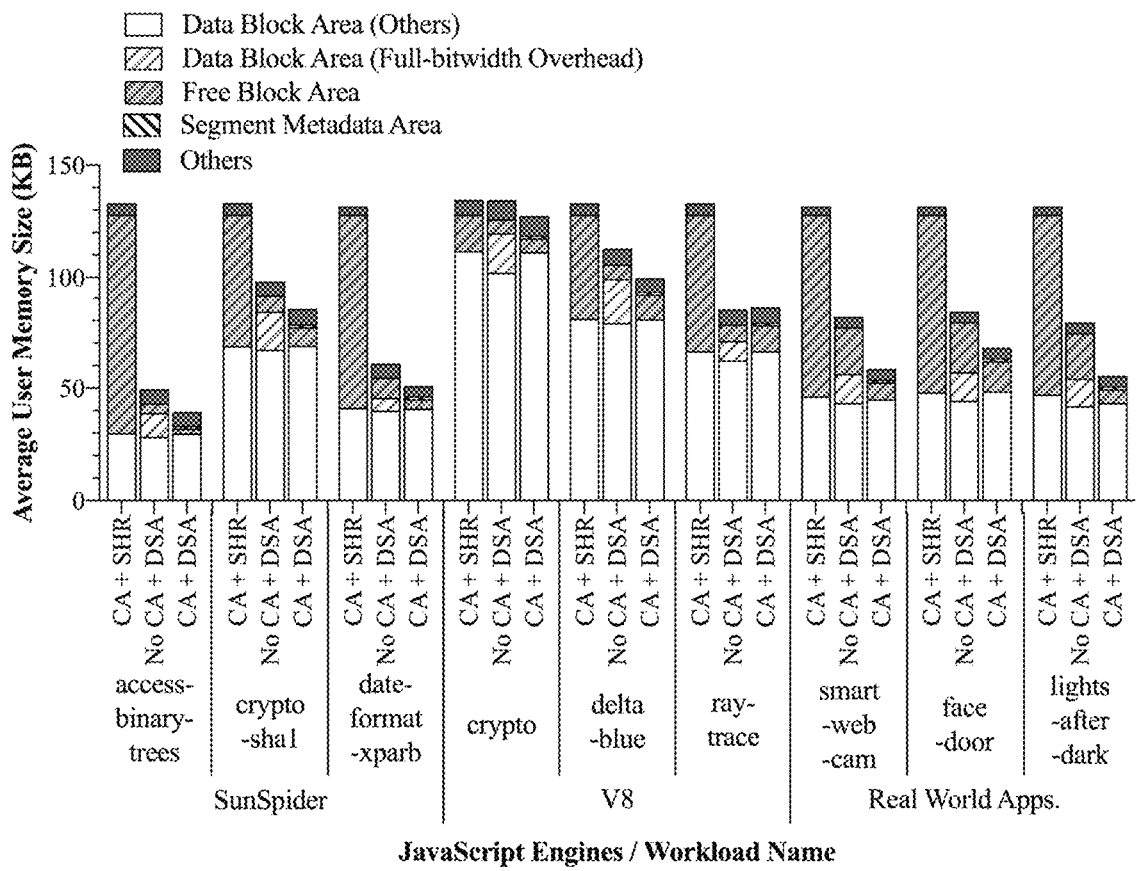

[FIG. 7A]
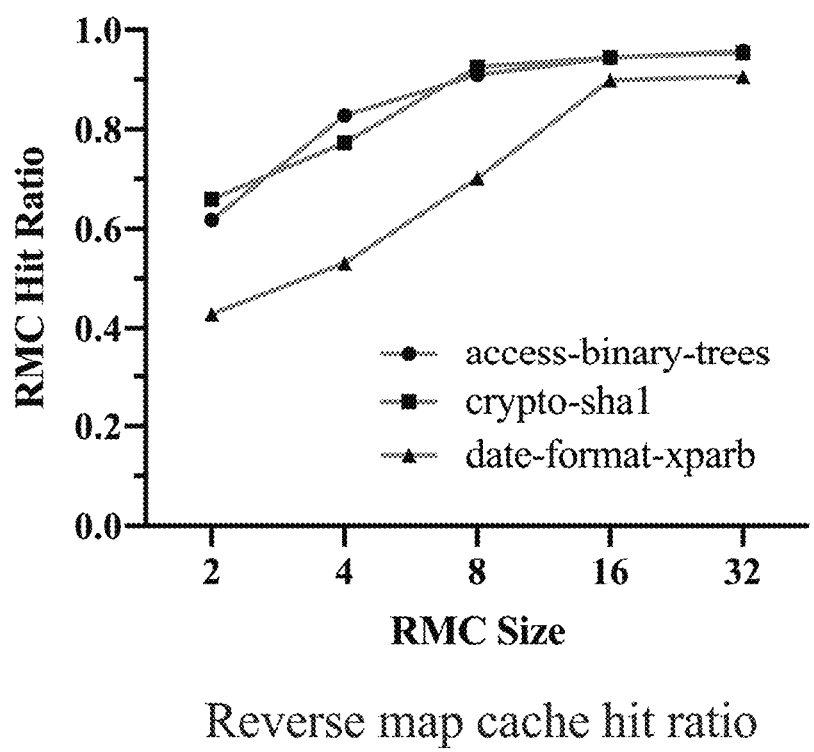
Reverse map cache hit ratio

[FIG. 7B]
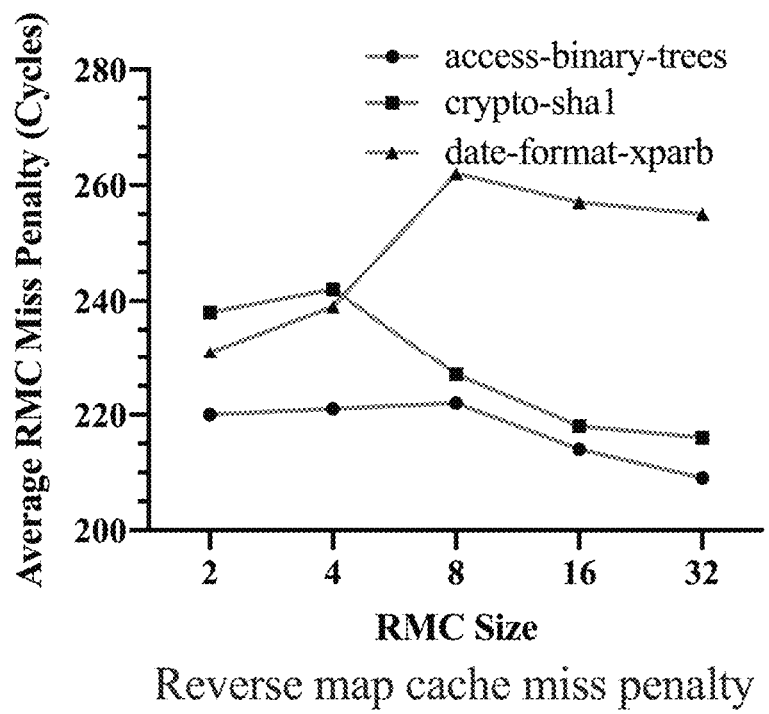
Reverse map cache miss penalty access-binary-trees crypto-sha1 date-format-xparb

METHOD AND APPARATUS FOR COMPRESSING ADDRESSES

CROSS-REFERENCE TO RELATED APPLICATIONS

This application claims the priority of Korean Patent Application No. 10-2020-0154112 filed on Nov. 17, 2020, in the Korean Intellectual Property Office, the disclosure of which is incorporated herein by reference.

BACKGROUND

Field

The present disclosure relates to a method and apparatus for compressing addresses, and more particularly to, a method and apparatus for compressing addresses for minimizing memory access in an address compression operation when using compressed addressing (CA) and dynamic segment allocation (DSA) in the JavaScript engine.

Description of the Related Art

The JavaScript engine dynamically allocates unused memory at runtime, releases unused memory through garbage collection, and an area to which memory is allocated by the JavaScript engine is called a memory heap.

FIG. 1A is a diagram illustrating a memory area in a static memory allocation method of a JavaScript engine, and FIG. 1B is a diagram illustrating a memory area in a dynamic memory allocation method of the JavaScript engine.

Referring to FIG. 1A, it can be seen that the size of the entire memory heap is fixed in the static memory allocation method. Accordingly, there is a problem in that it is difficult to simultaneously allocate a memory space for a lightweight JavaScript engine and an external library on an on-chip memory. Therefore, there is a problem in that no memory space is allocated to external libraries in which a JavaScript-based application program performs DNN-based machine learning or IoT standard communication in an MCU (see Non-Patent Document 1).

In order to solve this problem, dynamic memory allocation of the JavaScript engine has been proposed. The dynamic memory allocation methods are divided into a dynamic object allocation method and a dynamic segment allocation method. The dynamic object allocation method is a method of allocating memory using a system memory allocator every time an object is allocated, but is not used in most cases because of memory waste due to metadata (a memory area address and size) for the memory area managed by the system memory allocator. For this reason, the dynamic segment allocation method is used.

Referring to FIG. 1B, the dynamic segment allocation method allocates memory using a memory allocator of the JavaScript engine every time a segment is created. In the dynamic memory allocation method, because the memory space is allocated from the system memory allocator in a unit of segment and the corresponding space is allocated to an object, user memory size increases in proportion to the number of objects so that space which may be allocated to external libraries is provided. In addition, in the dynamic segment allocation method, the memory waste due to metadata managed by the system memory allocator is reduced (see Non-Patent Document 2).

However, when the dynamic segment allocation method and CA are used together, there is a problem in that latency greatly increases because the memory access increases in the address compression operation.

PRIOR ART DOCUMENT

Non-Patent Documents (Non-Patent Document 0001) "SunSpider JavaScript Benchmark." [Online]. Available: https://webkit.org/perf/sunspider/sunspider.html (Non-Patent Document 0002) Eunsoo Park, Hyemin Lee, and Donggun Shin, "A Study on Optimizing Heap Memory Allocation Method of Lightweight JavaScript Engine in IoT Devices", Proceedings of the 2016 Winter Conference of the Information Science Society, 2016

SUMMARY

An object of the present disclosure is to save memory through address compression and prevent latency by preventing an increase in the number of memory accesses during the address compression, in a dynamic segment allocation to provide a resizable JavaScript heap so that a JavaScript application and other external libraries may operate together in a microcontroller (MCU).

Other objects of the present disclosure that are not specified herein may be further considered within the scope that may be easily inferred from the following detailed description and effects thereof.

According to an embodiment of the present disclosure, a method of compressing an address includes receiving an input of a full address including a first part and a second part; checking a segment base address based on the first part in a previously stored reverse map cache (RMC); obtaining a block offset based on the segment base address and the second part; and outputting a compressed address by compressing the first part and the second part, respectively, based on the segment base address and the block offset.

The RMC may be a software cache that stores a reverse map entry for a recently accessed segment, and stores mapped data of a recently accessed segment index and the segment base address.

The checking of the segment base address may include extracting a corresponding cache index from the RMC based on the first part; accessing the reverse map entry in the RMC using the corresponding cache index and checking whether the segment base address of the corresponding reverse map entry matches the first part; and if the segment base address of the corresponding reverse map entry matches the first part, extracting a segment index matching the corresponding segment base address, and if the segment base address of the corresponding reverse map entry does not match the first part, checking the segment index based on the reverse map tree (RMT).

The RMT may be a red-black tree that sorts reverse map entries with respect to a segment base index.

The RMT may be updated when a segment is allocated or deallocated.

According to an embodiment of the present disclosure, an apparatus for compressing an address includes an input unit configured to receive an input of a full address including a first part and a second part; a storage unit storing a reverse map cache (RMC); and a control unit configured to check a segment base address based on the first part in the RMC, obtain a block offset based on the segment base address and the second part, and output a compressed address by compressing the first part and the second part, respectively, based on the segment base address and the block offset.

The storage unit may further store a reverse map tree (RMT), and the control unit may extract a corresponding cache index from the RMC based on the first part, access the reverse map entry in the RMC using the corresponding cache index and check whether the segment base address of the corresponding reverse map entry matches the first part, if the segment base address of the corresponding reverse map entry matches the first part, extract a segment index matching the corresponding segment base address, and if the segment base address of the corresponding reverse map entry does not match the first part, check the segment index based on the RMT.

The full address may be a full-bitwidth address of a segment allocated to a memory, and the memory may include a heap separated into a plurality of segments and a plurality of libraries separated by the segments.

BRIEF DESCRIPTION OF THE DRAWINGS

FIG. 2 is a diagram schematically showing the configuration of a dynamic memory allocation system of a JavaScript engine according to an embodiment of the present disclosure;

FIG. 3 is a block diagram illustrating the structure of an apparatus for compressing an address according to another embodiment of the present disclosure;

FIG. 4 is a flowchart illustrating a method of compressing an address according to another embodiment of the present disclosure;

FIG. 5 is a diagram illustrating a method of compressing according to an embodiment of the present disclosure;

FIG. 6 is a graph illustrating an improvement in user memory size of an engine by using a compression method according to an embodiment of the present disclosure;

FIGS. 7A and 7B are graphs illustrating a hit ratio and a miss penalty of a reverse map cache (RMC) according to an embodiment of the present disclosure.

DETAILED DESCRIPTION OF THE PREFERRED EMBODIMENT

Figure 1A:
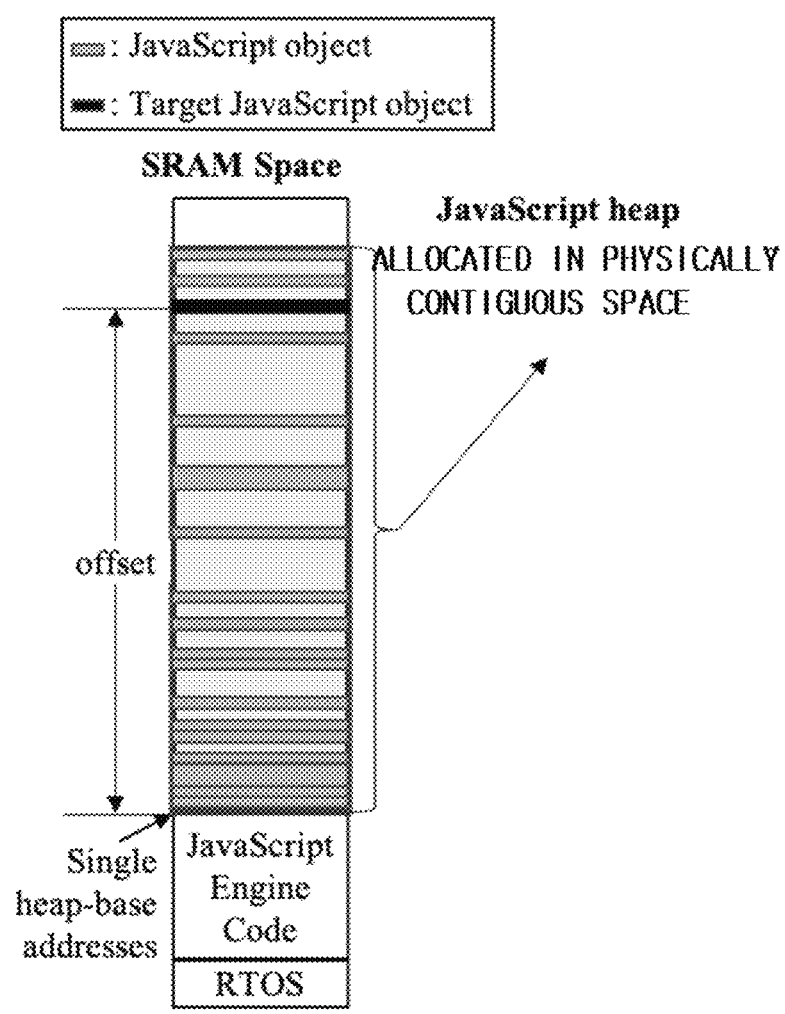
FIG. 1A is a diagram illustrating a memory area in a static memory allocation method of the JavaScript engine.
Figure 1B:
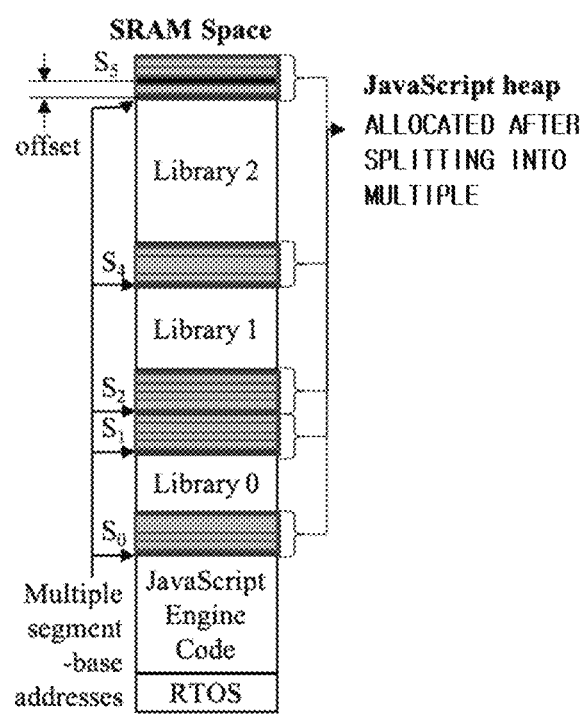
FIG. 1B is a diagram illustrating a memory area in a dynamic memory allocation method of the JavaScript engine.

Since the present disclosure may have various changes and have various embodiments, specific embodiments are illustrated in the drawings and described in detail in the detailed description. However, this is not intended to limit the present disclosure to specific embodiments, and it should be understood that all modifications, equivalents and substitutes included in the spirit and scope of the present disclosure are included. In describing each figure, like reference numerals have been used for like elements.

The terms used in the present application are only used to describe specific embodiments, and are not intended to limit the present disclosure. The singular expression includes the plural expression unless the context clearly dictates otherwise. In the present application, terms such as "comprise" or "have" are intended to designate that a feature, number, step, operation, component, part, or combination thereof described in the specification exists, but it should be understood that the terms do not preclude the possibility of addition or existence of one or more other features or numbers, steps, operations, components, parts, or combinations thereof.

Unless defined otherwise, all terms used herein, including technical or scientific terms, have the same meaning as commonly understood by one of ordinary skill in the art to which the present disclosure belongs. Terms such as those defined in commonly used dictionaries should be interpreted as having a meaning consistent with the meaning in the context of the related art, and should not be interpreted in an ideally or excessively formal meaning unless explicitly defined in the present application.

FIG. 2 is a diagram schematically showing the configuration of a dynamic memory allocation system of a JavaScript engine according to an embodiment of the present disclosure.

The dynamic memory allocation system 100 may include a dynamic segment allocator (DSA) 110, an address translator 130, and a memory 150.

The DSA 110 is in charge of segment allocation and deallocation, and manages a segment header table that is metadata for segment allocation.

The address translator 130 is also called a multi-base compressed address translator (MBCAT), and is in charge of conversion between a full-bitwidth address and a low-bitwidth address.

In an embodiment, the address translator 130 may include an address decompression unit 132 and an address compression unit 135.

The address decompression unit 132 receives the low-bitwidth address and converts the low-bitwidth address into the full-bitwidth address by using the segment base table.

The address compression unit 135 receives the full-bitwidth address and converts the full-bitwidth address into the low-bitwidth address.

The address compression unit 135 may include a reverse map cache (RMC) and a reverse map tree used for conversion.

The memory 150 may be an SRAM space. The memory 150 may include a heap separated into a plurality of segments and a plurality of libraries separated by the segments.

A segment base address is allocated at the bottom of the heap separated into the segments.

FIG. 3 is a block diagram illustrating the structure of an apparatus for compressing an address according to another embodiment of the present disclosure, and FIG. 4 is a flowchart illustrating a method of compressing an address according to another embodiment of the present disclosure.

The apparatus 200 for compressing the address further includes an input unit 210, a storage unit 220, and a control unit 230. The elements mentioned here are merely functionally divided for convenience of description, and may be physically integrated.

In step S110, the input unit 210 receives a full address and transmits the full address to the control unit 230.

The full address includes a first part and a second part. For example, the full address may be 32 bits. If the full address is 0000 0000 0000 0010 0010 0111 0000 0000, the first 21 bits may be the first part, and the 22 bits may be the second part.

The storage unit 220 stores data for compressing the address.

In an embodiment, the storage unit 220 stores a RMC and a reverse map tree (RMT).

The RMC is a software cache that stores a reverse map entry for a recently accessed segment, and stores mapped data of a recently accessed segment index and a segment base address. The reverse map entry includes a segment index pair of the segment base address.

The RMT is a red-black tree that sorts reverse map entries with respect to a segment base index.

For reference, the red-black tree is a self-balancing binary search tree, and is a typical data structure used to implement an associative array.

The RMT is updated when a segment is allocated or deallocated.

The control unit 230 converts the full address input through the input unit 210 into a compressed address and outputs the converted address.

In step S120, the control unit 230 checks the segment base address from the RMC stored in the storage unit 220 based on the first part.

In an embodiment, the control unit 230 extracts a corresponding cache index from the RMC based on the first part, accesses the reverse map entry in the RMC using the corresponding cache index, checks whether the segment base address of the corresponding reverse map entry matches the first part, if matched, extracts a segment index matching the corresponding segment base address, and if not matched, checks the segment index based on the RMT.

In step S130, a block offset is obtained based on the segment base address and the second part. Since blocks are allocated using a first-fit method, allocation and deallocation that occur at similar times increase the possibility of accessing the same segment.

In an embodiment, the block offset is obtained based on a difference between the second part of the full address and the segment base address.

In step s140, the full address may be converted into a compressed address by compressing the first part and the second part, respectively, based on the segment base address and the block offset.

A block offset is obtained based on a difference between the second part of a next full address and the segment base address. The second part is compressed with the obtained block offset.

Through this, the compressed address including the compressed first part and the compressed second part is output.

Hereinafter, an embodiment of the method of compressing the address described with reference to FIGS. 3 and 4 will be described in detail.

FIG. 5 is a diagram illustrating a method of compressing according to an embodiment of the present disclosure.

When a full address is input, an apparatus for compressing the address performs a segment identification operation to identify a segment to which a full-bitwidth address belongs. The full address is a full-bitwidth address, and may be 32 bits, but is not limited thereto.

After identifying a segment, the apparatus obtains a segment index and a segment base address of the corresponding segment.

The segment identification operation largely proceeds in two steps. First, the apparatus accesses a reverse map entry of a recently accessed segment through a RMC.

The apparatus compares a first part of the full-bitwidth address with the RMC, and when a hit occurs, identifies the segment using the corresponding reverse map entry.

More specifically, in order to compare the first part of the full-bitwidth address with the RMC, the apparatus modularizes the first part according to the RMC size. In an embodiment with reference to FIG. 5, the first part is modularized to 4. According to modularization, the apparatus checks a matching cache index and a mapped segment base address.

In an embodiment with reference to FIG. 5, the apparatus may check the segment base address '0x00022600' with respect to the full address 0x00022700, and a cache hit occurs and thus, compress the first part to the segment index '5=0000 0101' matching the segment base address '0x00022600'.

However, when a miss of the RMC occurs because there is no segment base address in which a difference between the first part and the segment base address stored in the RMC is within the segment size, the apparatus obtains the reverse map entry from the RMT and identifies the segment using the reverse map entry.

As described above, without performing a linear search on the reverse map, the apparatus identifies the segment using the RMC for recently stored data with high frequency, and when the segment is not identified using the RMC, uses the reverse map tree, thereby reducing memory access, and accordingly, greatly reducing latency of the address compression operation.

In other words, the RMC is a software cache for the reverse map entry. In the segment identification operation, the cache index is extracted from the first part of the full address, and the reverse map entry in the RMC is accessed using the corresponding cache index. Thereafter, the first part of the full address is compared with the segment base address on the reverse map entry to identify whether the reverse map entry points to a segment of the full address. A hit of the RMC occurs if the reverse map entry points to the target segment, otherwise a miss occurs. When the miss with the RMC occurs, a reverse map entry at a position of the cache index of the RMC is updated. If the JavaScript application has locality to access only a specific segment, the effect of reducing latency of many address compression operations may increase.

The RMT is a red-black tree for reverse map entries, and the reverse map entries are sorted with respect to the segment-base index. The RMT is updated when a new segment is allocated or when a segment is deallocated.

When the number of segments is N, assuming that the linear search is performed on the reverse map, access complexity of N reverse map memory occurs when performing the linear search, whereas, (1) complexity occurs when a hit occurs in the RMC by applying address compression optimization, and log N complexity occurs when the RMT is accessed due to a miss occurring in the RMC.

FIG. 6 is a graph illustrating an improvement in user memory size of an engine by using a compression method according to an embodiment of the present disclosure.

FIG. 6 shows an average user memory size in three cases when respectively executed on the SunSpider Benchmark, the V8 benchmark, and Raspberry Pi 3 for three actual user size examples. Here, the three cases include a case where static heap reservation (SHR) and CA are used, a case where CA is not used and dynamic segment allocation (DSA) is used, and a case where CA and DSA are simultaneously used. Here, it is assumed that the heap size is 128 KB.

As can be seen with reference to FIG. 6, when SHR and CA are used, an average memory space of 130 KB is used, whereas, when CA and DSA are simultaneously used, an average memory space smaller by 43.9% is used.

When both CA and DSA are used, the latency of address compression may worsen. In the related art, when CA and SHR are used, address compression cycles are 65, but if DSA is applied without other optimizations, the address compression cycles increase by 7.4 times, which requires average cycles of 483. Applying the RMT reduces overhead by an average of 32%, which reduces the address compression cycles to 327. In the case of the RMC, as the size of the RMC increases, because a hit ratio also increases, the address compression cycles are reduced. When RMC which has a size of 16 and is direct mapping cache is applied with the RMT, the overhead is further reduced by an average of 36%, which reduces the address compression cycles to 210.

When both CA and DSA are applied to a lightweight JavaScript engine, the average user memory size of the JavaScript engine is significantly reduced compared to other cases.

In the related art, when the lightweight JavaScript engine uses CA and SHR, a large amount of contiguous physical memory space has to be reserved for the JavaScript heap even if the data block size is small.

The method of compressing the address according to an embodiment of the present disclosure may be effectively used in a microprocessor-based IoT apparatus. By utilizing the present disclosure, an address compression overhead that occurs when the lightweight JavaScript engine and external libraries are used simultaneously on a microprocessor may be reduced, and the execution time of the JavaScript application may be reduced.

FIGS. 7A and 7B are graphs illustrating a hit ratio and a miss penalty of a RMC according to an embodiment of the present disclosure.

FIG. 7A is a graph showing the hit ratio (y-axis) of the RMC with respect to the size (x-axis) of the RMC according to an embodiment of the present disclosure, and FIG. 7B is a graph showing the miss penalty (y-axis) with respect to the RMC size (x-axis) according to an embodiment of the present disclosure.

When the RMC is used for the Sun Spider benchmark in the lightweight JavaScript engine, locality for segments is high. FIG. 7A shows values measured for three workloads constituting the Sun Spider benchmark, and it may be seen that the larger the size, the higher the hit ratio for each workload. Even if the RMC size is set to only 4 to 8, a compression latency is reduced by 30%, and if the RMC size is further increased, the compression latency may be reduced by 40%.

Figure 8A:
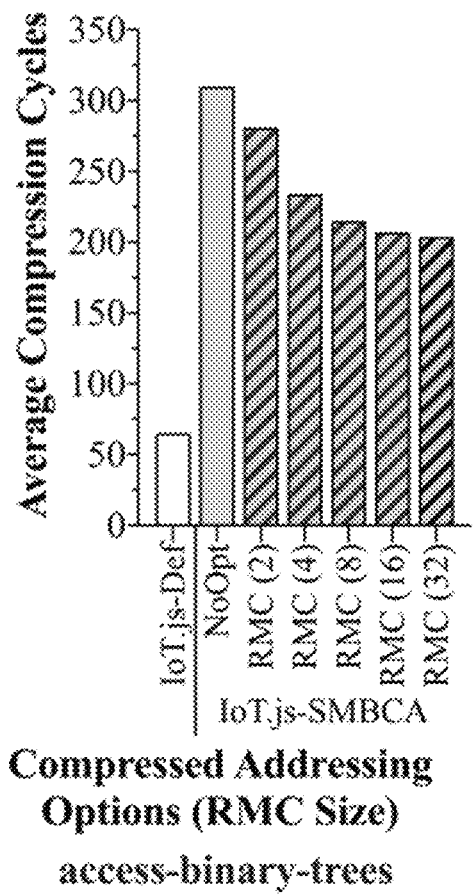
FIGS. 8A to 8C are graphs illustrating average compression cycles for the RMC size according to an embodiment of the present disclosure.
Figure 8B:
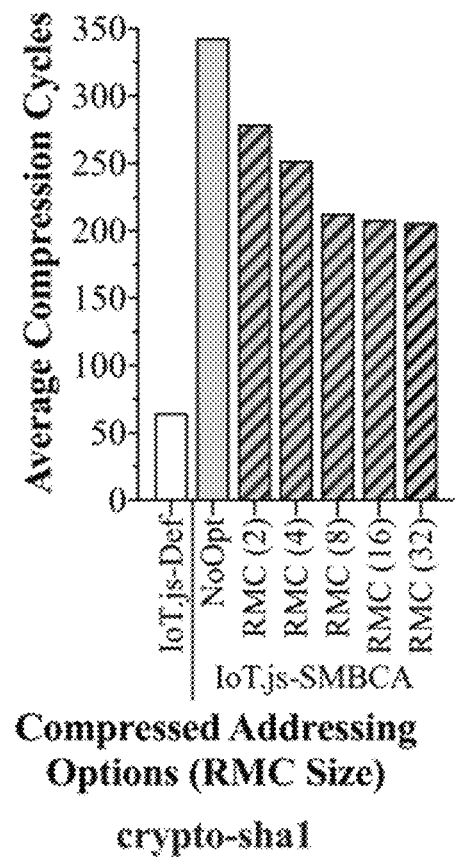
Figure 8C:
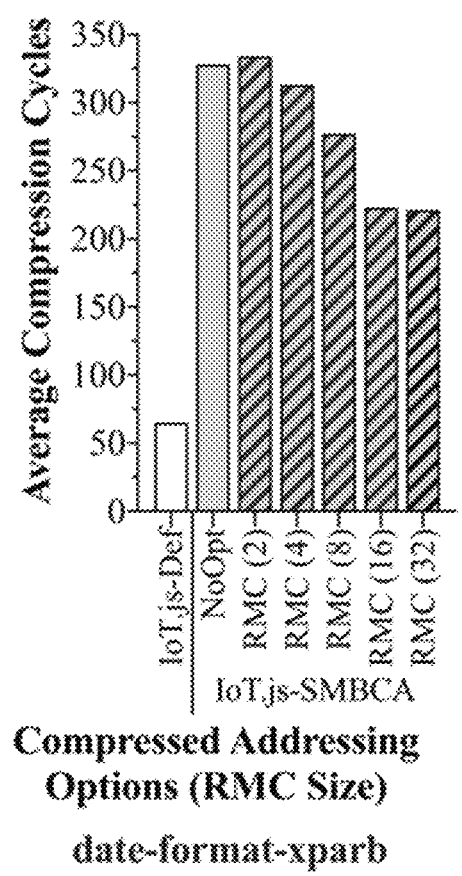

FIGS. 8A to 8C are graphs illustrating average compression cycles for the RMC size according to an embodiment of the present disclosure.

Referring to FIGS. 8A to 8C, it may be seen that the adoption of the RMC in a lightweight JavaScript engine target is effective in reducing the compression latency.

As described above, according to the embodiments of the present disclosure, it is possible to reduce the address compression overhead that occurs when the lightweight JavaScript engine and external libraries are used simultaneously on the microprocessor, and reduce the execution time of the JavaScript application program.

Even if it is an effect not explicitly mentioned herein, the effects described in the following specification expected by the technical features of the present disclosure and potential effects thereof are treated as if they are described in the specification of the present disclosure.

The operation according to an embodiment of the present disclosure may be implemented in the form of program instructions that can be executed through various computer means and recorded in a computer-readable medium. The computer-readable medium represents any medium that participates in providing instructions to a processor for execution. The computer-readable medium may include program instructions, data files, data structures, or a combination thereof. For example, the computer-readable medium may be a magnetic medium, an optical recording medium, a memory, etc. A computer program may be distributed over a networked computer system so that a computer readable code is stored and executed in a distributed manner. Functional programs, codes, and code segments for implementing the present embodiment may be easily inferred by programmers in the art to which the present embodiment belongs.

The above description is merely illustrative of the technical idea of the present disclosure, and a person of ordinary skill in the art to which the present disclosure pertains may make various modifications and variations without departing from the essential characteristics of the present disclosure. Accordingly, the embodiments implemented in the present disclosure are not intended to limit the technical spirit of the present disclosure, but to explain, and the scope of the technical spirit of present disclosure is not limited by these embodiments. The protection scope of the present disclosure should be interpreted by the following claims, and all technical ideas within the scope equivalent thereto should be construed as being included in the scope of the present disclosure.

What is claimed is:

1. A method of compressing an address, the method comprising:
   receiving an input of a full address including a first part and a second part;
   checking a segment base address based on the first part in a previously stored reverse map cache (RMC);
   obtaining a block offset based on the segment base address and the second part; and
   outputting a compressed address by compressing the first part and the second part, respectively, based on the segment base address and the block offset.

2. The method of claim 1, wherein the RMC is a software cache that stores a reverse map entry for a recently accessed segment, and stores mapped data of a recently accessed segment index and the segment base address.

3. The method of claim 2, wherein the checking of the segment base address includes:
   extracting a corresponding cache index from the RMC based on the first part;
   accessing the reverse map entry in the RMC using the corresponding cache index and checking whether the segment base address of the corresponding reverse map entry matches the first part; and
   if the segment base address of the corresponding reverse map entry matches the first part, extracting a segment index matching the corresponding segment base address, and if the segment base address of the corresponding reverse map entry does not match the first part, checking the segment index based on the reverse map tree (RMT).

4. The method of claim 3, wherein the RMT is a red-black tree that sorts reverse map entries with respect to a segment base index.

5. The method of claim 4, wherein the RMT is updated when a segment is allocated or deallocated.

6. An apparatus for compressing an address, the apparatus comprising:
   an input unit configured to receive an input of a full address including a first part and a second part;
   a storage unit storing a reverse map cache (RMC); and
   a control unit configured to check a segment base address based on the first part in the RMC, obtain a block offset based on the segment base address and the second part, and output a compressed address by compressing the first part and the second part, respectively, based on the segment base address and the block offset.

7. The apparatus of claim 6, wherein the RMC is a software cache that stores a reverse map entry for a recently accessed segment, and stores mapped data of a recently accessed segment index and the segment base address.

8. The apparatus of claim 7,
wherein the storage unit is further configured to store a reverse map tree (RMT), and
wherein the control unit is further configured to extract a corresponding cache index from the RMC based on the first part, access the reverse map entry in the RMC using a corresponding cache index and check whether the segment base address of the corresponding reverse map entry matches the first part, if the segment base address of the corresponding reverse map entry matches the first part, extract a segment index matching the corresponding segment base address, and if the segment base address of the corresponding reverse map entry does not match the first part, check the segment index based on the RMT.

9. The apparatus of claim 8, wherein the RMT is a red-black tree that sorts reverse map entries with respect to a segment base index.

10. The apparatus of claim 8, wherein the RMT is updated when a segment is allocated or deallocated.

11. The apparatus of claim 6,
wherein the full address is a full-bitwidth address of a segment allocated to a memory, and
wherein the memory includes a heap separated into a plurality of segments and a plurality of libraries separated by the segments.

* * * * *